(12) United States Patent
Hanna et al.

(10) Patent No.: US 8,453,991 B2
(45) Date of Patent: Jun. 4, 2013

(54) DAMPED PRODUCT WITH INSERT AND METHOD OF MAKING THE SAME

(75) Inventors: Michael D. Hanna, West Bloomfield, MI (US); Richard M. Kleber, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/094,328

(22) Filed: Apr. 26, 2011

(65) Prior Publication Data

US 2011/0192955 A1 Aug. 11, 2011

Related U.S. Application Data

(62) Division of application No. 11/832,401, filed on Aug. 1, 2007, now Pat. No. 7,938,378.

(51) Int. Cl.
*F16M 13/00* (2006.01)

(52) U.S. Cl.
USPC .............................. 248/634; 248/560; 188/381

(58) Field of Classification Search
USPC ............ 188/218, 18 A, 218 R, 381; 248/634, 248/560
See application file for complete search history.

(56) References Cited

U.S. PATENT DOCUMENTS

| | | | | | |
|---|---|---|---|---|---|
| 5,161,652 | A | * | 11/1992 | Suzuki | 188/218 XL |
| 5,460,249 | A | * | 10/1995 | Aoki | 188/218 XL |
| 6,457,567 | B1 | * | 10/2002 | Bunker | 188/18 A |
| 7,163,091 | B2 | * | 1/2007 | Shamine et al. | 188/218 XL |
| 7,543,691 | B2 | * | 6/2009 | Hopkins et al. | 188/218 XL |
| 7,549,519 | B2 | * | 6/2009 | Atwater et al. | 188/381 |
| 2003/0141154 | A1 | * | 7/2003 | Rancourt et al. | 188/218 XL |
| 2004/0084260 | A1 | * | 5/2004 | Hoyte et al. | 188/218 XL |
| 2004/0187581 | A1 | * | 9/2004 | Kamiya et al. | 73/593 |

* cited by examiner

*Primary Examiner* — Amy J Sterling

(74) *Attorney, Agent, or Firm* — BrooksGroup

(57) ABSTRACT

One embodiment includes a method including providing a first portion of a product, the first portion of the product having a body and a flange extending therefrom; and casting a material around at least a portion of the flange to enclose the same and to provide a second portion of the product and wherein the at least the portion of the flange is constructed and arranged to provide frictional damping of the product.

21 Claims, 8 Drawing Sheets

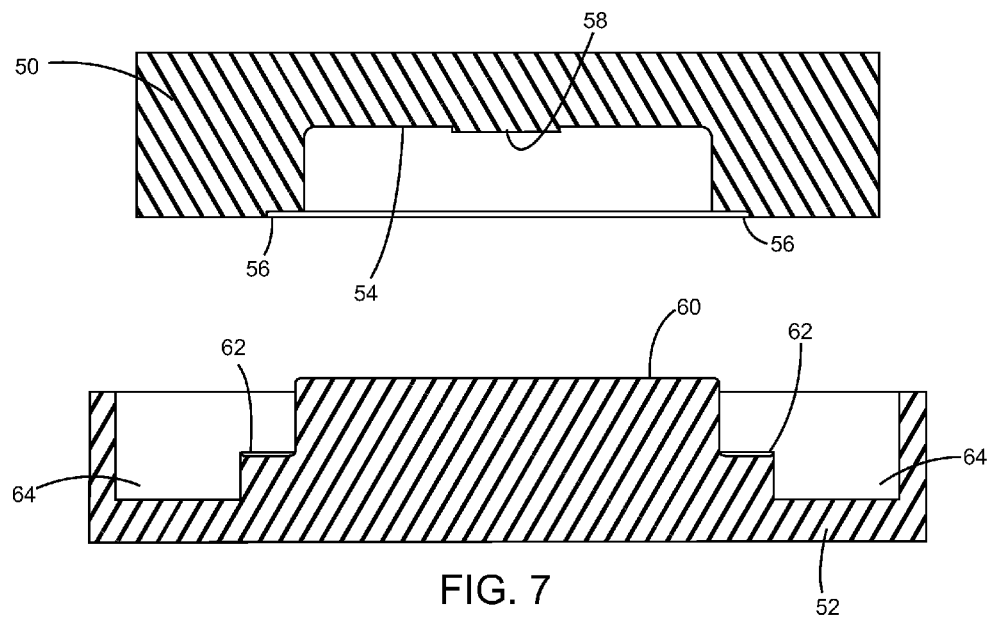
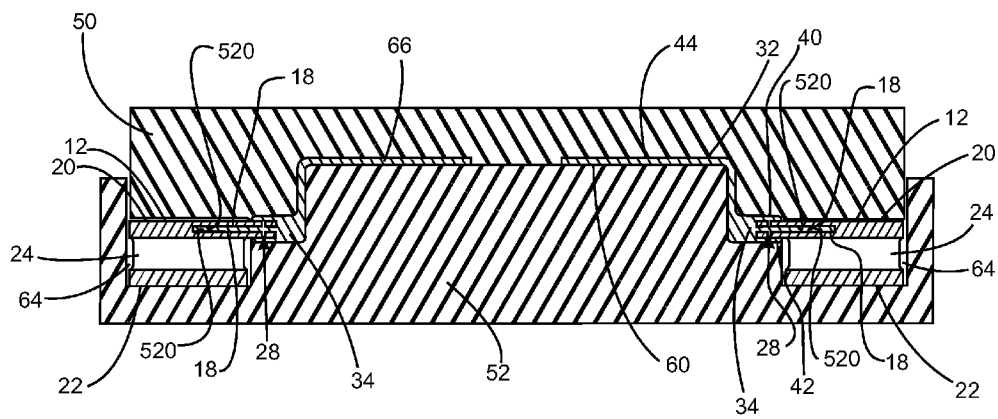

DAMPED PRODUCT WITH INSERT AND METHOD OF MAKING THE SAME

CROSS-REFERENCE TO RELATED APPLICATIONS

This application is a divisional of U.S. application Ser. No. 11/832,401 filed Aug. 1, 2007.

TECHNICAL FIELD

The field to which the disclosure generally relates includes a product with an insert and a method of making the same.

BACKGROUND

Parts subjected to vibration may produce unwanted or undesirable vibrations. Similarly, a part or component may be set into motion at an undesirable frequency and/or amplitude and for a prolonged period. For example, parts such as brake rotors, brackets, pulleys, brake drums, transmission housings, gears, and other parts may contribute to noise that gets transmitted to the passenger compartment of a vehicle. In an effort to reduce the generation of this noise and thereby its transmission into the passenger compartment, a variety of techniques have been employed, including the use of polymer coatings on engine parts, sound absorbing barriers, and laminated panels having visco elastic layers. The undesirable vibrations in parts or components may occur in a variety of other products including, but not limited to, sporting equipment, household appliances, manufacturing equipment such as lathes, milling/grinding/drilling machines, earth moving equipment, other nonautomotive applications, and components that are subject to dynamic loads and vibration. These components can be manufactured through a variety of means including casting, machining, forging, die-casting, etc.

SUMMARY OF EXEMPLARY EMBODIMENTS OF THE INVENTION

One embodiment includes a method including providing a first portion of a product, the first portion of the product having a body and a flange extending therefrom; and casting a material around at least a portion of the flange to enclose the same and to provide a second portion of the product and wherein the at least the portion of the flange is constructed and arranged to provide frictional damping of the product. The material for the body and flange may be different than that of the casting material.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein:

FIG. 7 illustrates a method of making a product according to one embodiment of the invention;

FIG. 8 illustrates a method of making a product according to one embodiment of the invention;

DETAILED DESCRIPTION OF EXEMPLARY EMBODIMENTS

The following description of the embodiment(s) is merely exemplary in nature and is in no way intended to limit the invention, its application, or uses.

Figure 1:
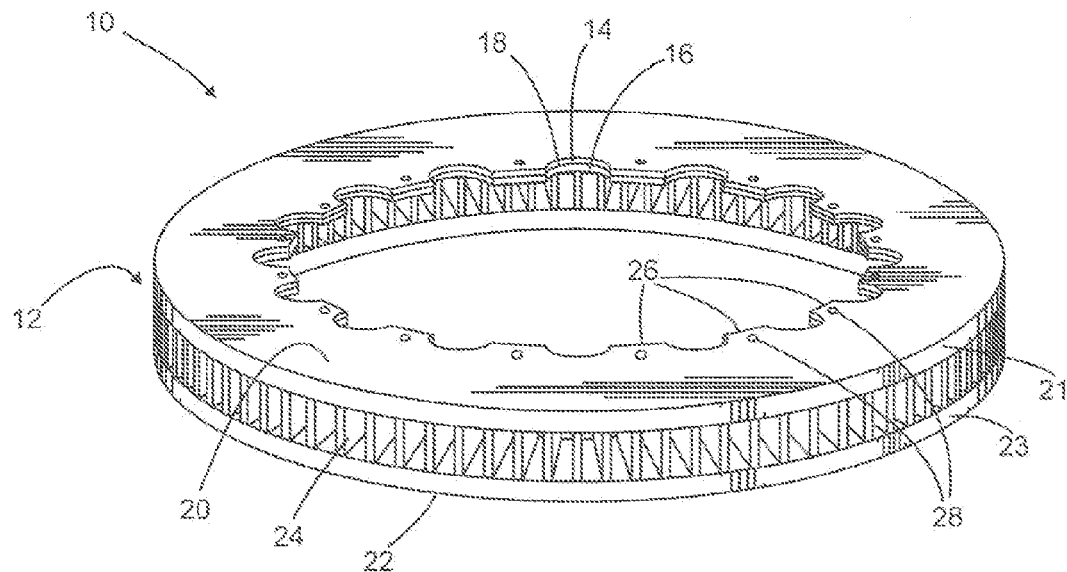
FIG. 1 is a perspective view of a product according to one embodiment of the invention.

FIG. 1 shows a perspective view of a product 10 including an annular portion 12. In various embodiments of the invention, the product 10 may include, for example, but is not limited to a bracket, pulley, brake drum, transmission housing, gear, motor housing, shaft, bearing, engine, baseball bat, lathe machine, milling machine, drilling machine, or grinding machine. In one embodiment of the invention, the product 10 may be an automobile part, for example a disc brake rotor 10. The annular portion 12 includes a first annular flange portion 14 and a second annular flange portion 16. Between the first annular flange portion 14 and the second annular flange portion 16 is a slot 18. In one embodiment the slot 18 has a minimum depth of 5 millimeters. The annular portion 12 may include a first rotor cheek 21 including a first brake pad engagement face 20. In the embodiment shown in FIG. 1, the annular portion 12 may also include a second rotor cheek 23 including a second brake pad engagement face 22. In the embodiments including the two engagement faces 20 and 22, the rotor may be vented and the first face 20 and the second face 22 may be separated by a plurality of vanes 24. While the rotor 10 shown is vented, in other embodiments the rotor 10 may not have vents.

The faces 20 and 22 may be adapted for engagement by at least one associated friction member such as a brake pad (not shown), where the brake pad(s) may push outward on the faces 20 and 22 to stop the motion of an automobile or to prevent a stopped automobile from moving. The first annular flange portion 14 and the second annular flange portion 16 may extend from the first face 20. In one embodiment, the first annular flange portion 14 and the second annular flange portion 16 may optionally include a plurality of teeth 26. In another embodiment, the first annular flange portion 14 and the second annular flange portion 16 may optionally include through holes 28 and the through holes 28 may be located in at least one of the plurality of teeth 26 (if present). In another embodiment (not shown), the first annular flange portion 14 and the second annular flange portion 16 may include the through holes 28 but not include the plurality of teeth 26.

Figure 2:
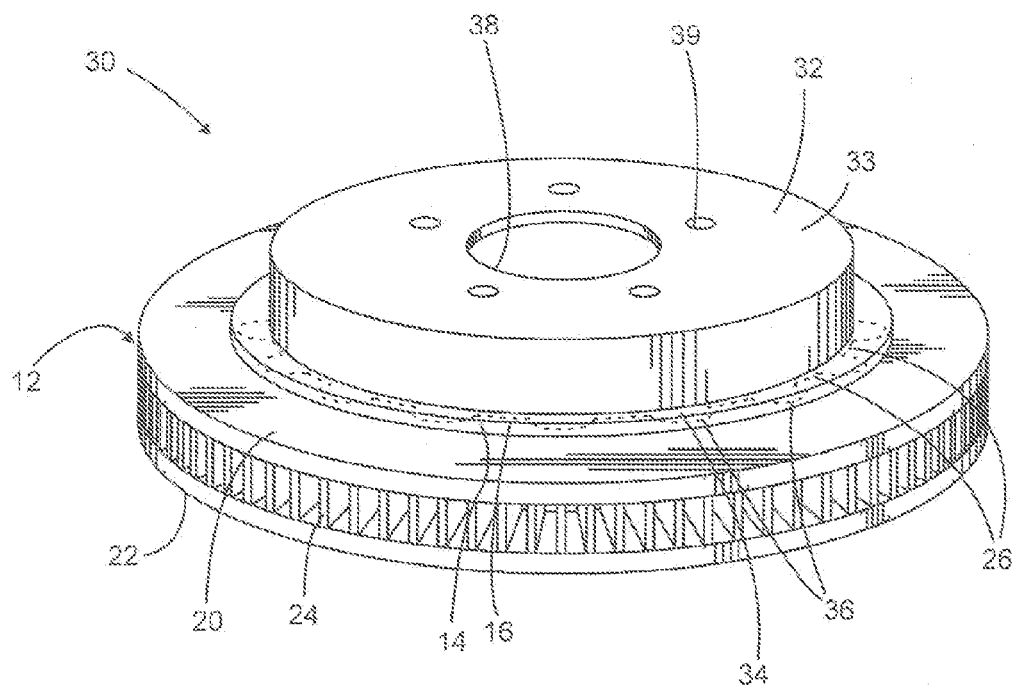
FIG. 2 is a perspective view of a product according to one embodiment of the invention.

Referring now to FIG. 2, a product 30, for example a rotor assembly 30, is provided according to one embodiment of the invention. The rotor assembly 30 includes the annular portion 12, the first annular flange portion 14 and the second annular flange portion 16, a hub portion 32, and a second flange portion 34 extending from the hub portion 32. The second flange portion 34 may be constructed and arranged to engage the first annular flange portion 14 and the second annular flange portion 16, and thereby prevent rotation of the hub portion 32 relative to the annular portion 12.

In one embodiment including the through holes 28 in the first annular flange portion 14 and the second annular flange portion 16 (shown in FIG. 1), the through holes 28 may interact with the second flange portion 34. In one embodiment including the plurality of teeth 26 (shown with phantom lines), the second flange portion 34 may also include a plurality of hub teeth 36 (shown with phantom lines) adapted to engage the complementary teeth on the first annular flange portion 14 and the second annular flange portion 16.

Still referring to FIG. 2, in one embodiment, the annular portion 12 may include a first material. In one embodiment the first material may comprise one of cast iron, gray cast iron, or steel. The hub portion 32, including the second flange portion 34, may include a second material that may be lighter by volume than the first material. In one embodiment the second material may comprise one of aluminum, aluminum metal matrix composites, titanium, magnesium, plastic, or composite material. The second material may provide the finished rotor assembly 30 with sufficient mechanical and thermal properties to satisfy the requirements of brake rotor designs at a significantly reduced weight. In one embodiment, the overall weight of the rotor assembly 30 is less than that of a comparable rotor assembly composed entirely of cast iron or steel.

In another embodiment, the hub portion 32 may include a central mounting face 33 for mounting the rotor on an associated drive member. The hub portion 32 may also include features to facilitate the attachment of the rotor assembly to an accessory drive component such as a shaft. These features may include, for example, a central aperture 38 and a plurality of bolt holes 39. The central aperture 38 may be a cylindrical or conical bored hole. The features such as the central aperture 38 and the plurality of bolt holes 39 may be machined after the casting process. In other embodiments, the features may include a locking element (not shown) or a keyhole (not shown).

Figure 3:
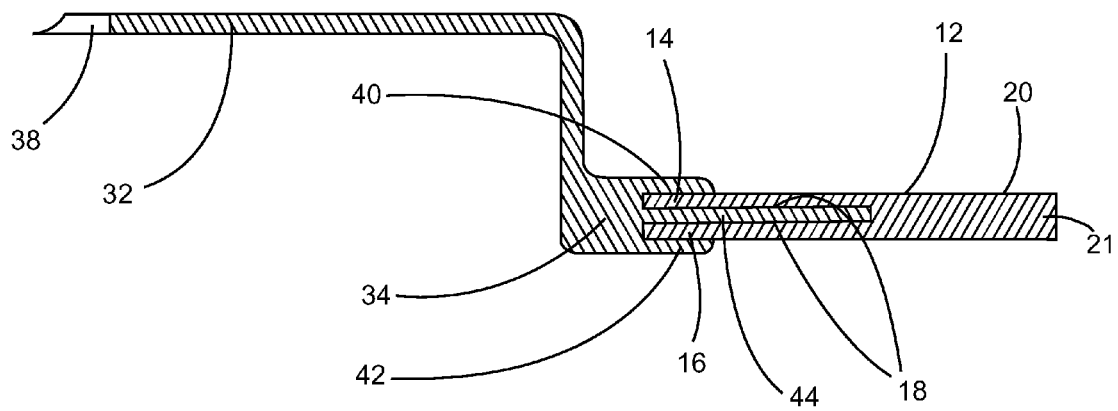
FIG. 3 is a partial sectional view of a product according to one embodiment of the invention.

Referring now to FIG. 3, a partial sectional view of the rotor assembly 30 is shown, according to one embodiment of the invention. The second flange portion 34 of the hub portion 32 is constructed and arranged to engage the first annular flange portion 14 and the second annular flange portion 16. The second flange portion 34 may include a first hub flange portion 40, a second hub flange portion 42, and a third hub flange portion or an insert 44 in between the first hub flange portion 40 and the second hub flange portion 42. The insert 44 may be located in a slot 18 between the first annular flange portion 14 and the second annular flange portion 16. A coating may be provided over at least a portion of the annular portion 12 by, for example, by spin coating. Further embodiments of the insert 44 and coating are provided herein.

Figure 4:
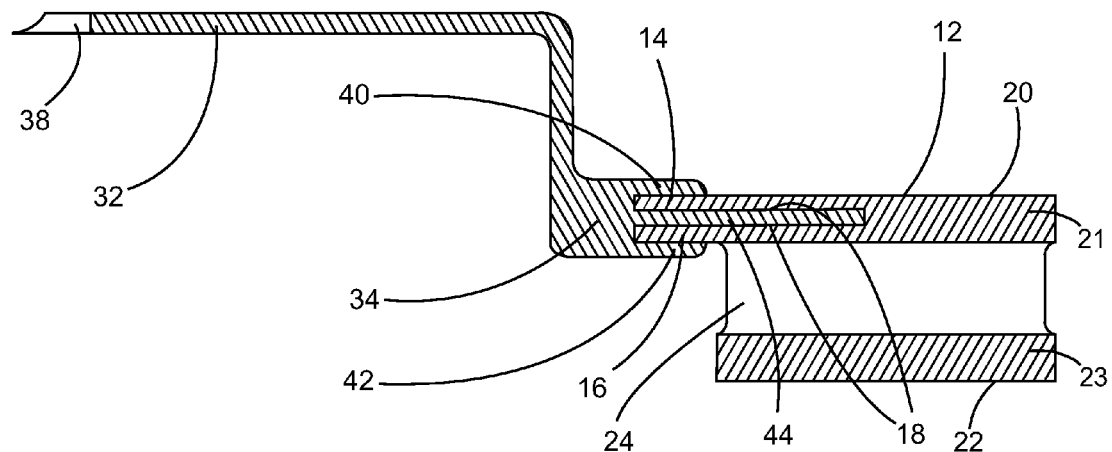
FIG. 4 is a partial sectional view of a product according to one embodiment of the invention.

Still referring to FIG. 3, the first annular flange portion 14 may engage the first hub flange portion 40 and the insert 44. The second annular flange portion 16 may engage the insert 44 and the second hub flange portion 42. In one embodiment, the insert 44 may be trapped from the first annular flange portion 14 to the second annular flange portion 16. In one embodiment shown in FIG. 3, the annular portion 12 includes the first face 20. As shown in FIG. 4, in another embodiment, the annular portion 12 includes the first face 20 and the second face 22. The annular portion 12 may also include the plurality of vanes 24.

Figure 5:
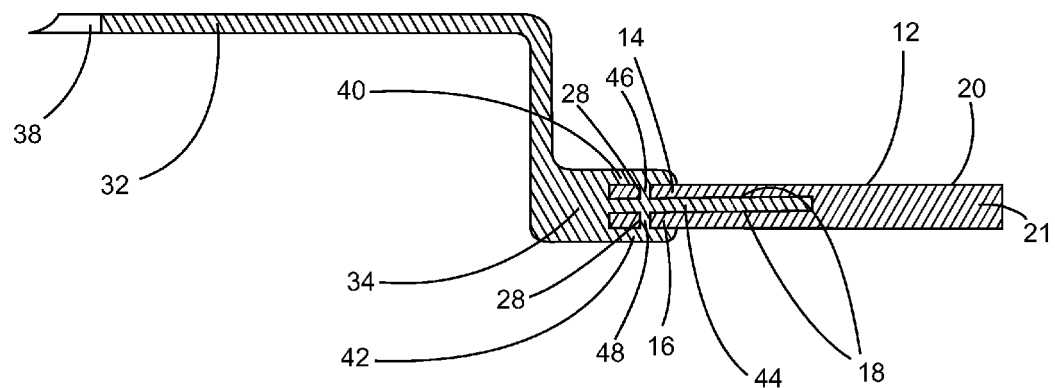
FIG. 5 is a partial sectional view of a product according to one embodiment of the invention.

In various embodiments, the first annular flange portion 14 and the second annular flange portion 16 include the plurality of through holes 28. Referring now to FIG. 5, the first hub flange portion 40 and the second hub flange portion 42 may fill the plurality of through holes 28 to form a plurality of first connectors (interlocking portions or splines) 46 and a plurality of second connectors (interlocking portions or splines) 48, respectively. In another embodiment not shown, the plurality of through holes 28 extend through the first annular flange portion 14 but not the second annular flange portion 16, and the first hub flange portion 40 fills the plurality of through holes 28 to form a plurality of first connectors 46. In another embodiment not shown, the plurality of through holes 28 extend through the second annular flange portion 16 but not the first annular flange portion 14, and the second hub flange portion 42 fills the plurality of through holes 28 to form a plurality of second connectors 48. In another embodiment not shown, the insert 44 has a plurality of through holes, and the first annular flange portion 14 and the second annular flange portion 16 fill the through holes 28 to form a plurality of connectors.

Figure 6:
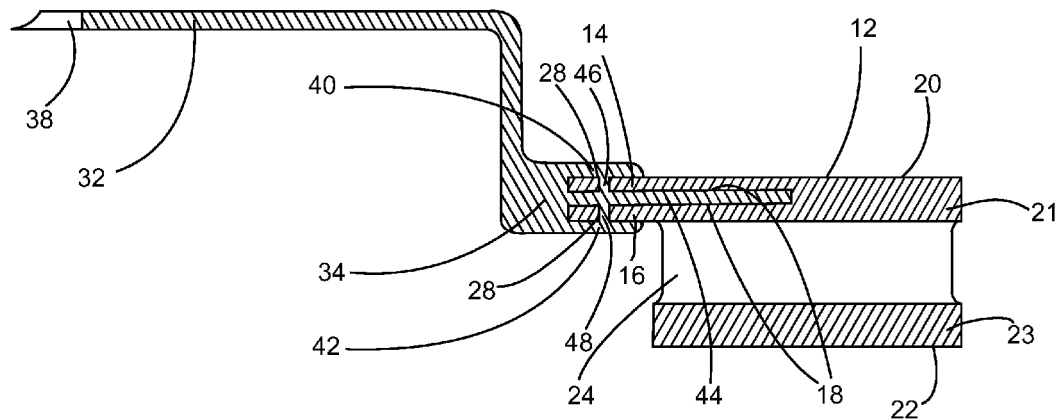
FIG. 6 is a partial sectional view of a product according to one embodiment of the invention.
Figure 9:
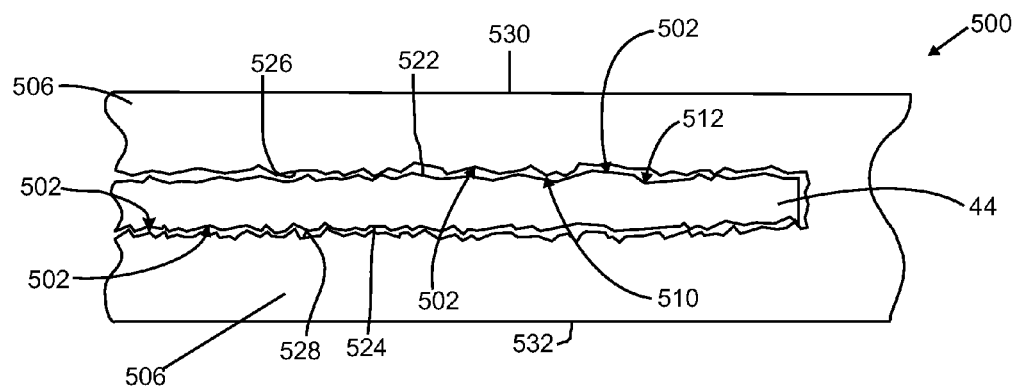
FIG. 9 is a sectional view with portions broken away of one embodiment of the invention including an insert.

Referring still to FIG. 5, the plurality of first connectors 46 are formed to connect the first hub flange portion 40 and the insert 44. The plurality of second connectors 48 are formed to connect the second hub flange portion 42 and the insert 44. The plurality of first connectors 46 and the plurality of second connectors 48 may provide a mechanical interface between the hub portion 32 and the annular portion 12 that is capable of transmitting the torque required. In the embodiment shown in FIG. 5, the annular portion 12 includes the first face 20. As shown in FIG. 6, in another embodiment, the annular portion 12 includes the first rotor cheek 21 and the second rotor cheek 23 and may include a plurality of vanes 24 extending therebetween.

Referring now to FIG. 7, a method of producing the product 30 is shown according to one embodiment of the invention. A first mold portion 50 and a second mold portion 52 are configured to manufacture the product 30, for example the rotor assembly 30, and are shown in an open position. The first mold portion 50 and the second mold portion 52 may be sand molds. The first mold portion 50 includes a first mold portion surface 54 and a first sealing lip 56. The first mold portion surface 54 may define the outer surfaces of the hub portion 32 (shown in FIG. 2). The first sealing lip 56 may define the edges of the first hub flange portion 40 (shown in FIGS. 3-6). In one embodiment, the first mold portion 50 also includes a generally cylindrical protrusion 58 configured to produce the central aperture 38 (shown in FIG. 2). But in other embodiments, the central aperture 38 may be produced by a subsequent machining process. In one embodiment, the plurality of bolt holes 39 (shown in FIG. 2) may be produced by a plurality of smaller protrusions (not shown) in the first mold portion 50 or by a subsequent machining process.

Still referring to FIG. 7, the second mold portion 52 includes a second mold portion surface 60, a second sealing lip 62, and an annular portion cavity 64. The second mold portion surface 60 may define the inner surfaces of the hub portion 32. The second sealing lip 62 may define the edges of the second hub flange portion 42 (shown in FIGS. 3-6). The annular portion cavity 64 may be of a size and shape to readily accept the insertion of the annular portion 12.

As shown in FIG. 8, in one embodiment of the invention the annular portion 12 is placed in the annular portion cavity 64. The annular portion 12 includes the slot 18, which may be machined or cast-in. In one embodiment, at least a portion of the slot 18 is coated with a coating. The coating may be sprayed on. The annular portion 12 may be rotated or spun during coating of the slot 18.

According to the method of one embodiment of the invention, the first mold portion 50 is then placed over the second mold portion 52. A compressive force is applied to the first mold portion 50 and the second mold portion 52, which in turn applies a compressive force clamping the second flange portion 34 between the first sealing lip 56 and the second sealing lip 62. The sealing lips 56 and 62 may define the perimeter of a central cavity 66 that is formed between the first mold portion 50 and the second mold portion 52. A second material is then introduced into the central cavity 66 to form the hub portion 32. The second material may be a molten substance, for example molten aluminum, aluminum metal matrix composites, titanium, or magnesium. The second material is transferred into the central cavity 66, for example injected into the central cavity 66. In another embodiment, the second material is a semi-solid material and may be introduced into the central cavity 66 in accordance with the well known semi-solid forging process. The sealing lips 56 and 62 may prevent the second material from leaking out of the central cavity 66.

In one embodiment, the second material forms the hub portion 32 and the second flange portion 34, as shown in FIG. 8. As part of the second flange portion 34, the second material forms the first hub flange portion 40, the second hub flange portion 42, and the insert 44. In one embodiment, the second material is molten and forms a plurality of hub teeth 36 which mechanically interlock with the complementary plurality of teeth 26.

In one embodiment, the first mold portion 50, the second mold portion 52, and the annular portion 12 are maintained at a predetermined elevated temperature before the material is transferred into the central cavity 66, such that the material does not prematurely cool upon contact with a relatively cold surface. After the passing of a sufficient cooling time, the tools 50 and 52 may return to the open position as shown in FIG. 7 and the rotor assembly 30 may be removed for further processing. Further processing may include, for example, machining features into the hub portion 32 such as the central aperture 38 and the plurality of bolt holes 39 shown in FIG. 2. When the tools 50 and 52 are returned to the open position, the next annular portion 12 may be inserted into the open tooling and the manufacturing process of the product 30 may repeat.

In another embodiment (not shown), the hub portion 32 is placed in the first mold portion 50. The first mold portion 50 is then placed over the second mold portion 52, and a first material is introduced into a cavity to form the annular portion 12. In this embodiment, the insert 44 of the hub portion 32 may be coated.

In another embodiment, the first material and the second material are substantially the same. The first mold portion 50 and second mold portion 52 may be used in both the horizontal and vertical casting operation.

In one embodiment, the insert 44 may be positioned as shown in FIGS. 9-22. Other embodiments may include a frictional damping means as shown in FIGS. 9-22 in addition to the insert 44 (third hub flange portion) extending from the hub portion 32.

Referring to FIGS. 9-22, one embodiment of the invention includes a product or part 500 having a frictional damping means. The frictional damping means may be used in a variety of applications including, but not limited to, applications where it is desirable to reduce noise associated with a vibrating part or reduce the vibration amplitude and/or duration of a part that is struck, dynamically loaded, excited, or set in motion. In one embodiment the frictional damping means may include an interface boundary conducive to frictionally damping a vibrating part. In one embodiment the damping means may include frictional surfaces 502 constructed and arranged to move relative to each other and in frictional contact, so that vibration of the part is dissipated by frictional damping due to the frictional movement of the surfaces 502 against each other.

According to various illustrative embodiments of the invention, frictional damping may be achieved by the movement of the frictional surfaces 502 against each other. The movement of frictional surfaces 502 against each other may include the movement of: surfaces of the body 506 of the part against each other; a surface of the body 506 of the part against a surface of the insert 44; a surface of the body 506 of the part against the layer 520; a surface of the insert 44 against the layer 520; a surface of the body 506 of the part against the particles 514 or fibers; a surface of the insert 44 against the particles 514 or fibers; or by frictional movement of the particles 514 or fibers against each other or against remaining binder material.

In embodiments wherein the frictional surface 502 is provided as a surface of the body 506 or the insert 44 or a layer 520 over one of the same, the frictional surface 502 may have a minimal area over which frictional contact may occur that may extend in a first direction a minimum distance of 0.1 mm and/or may extend in a second (generally traverse) direction a minimum distance of 0.1 mm. In one embodiment the insert 44 may be an annular body and the area of frictional contact on a frictional surface 502 may extend in an annular direction a distance ranging from about 20 mm to about 1000 mm and in a transverse direction ranging from about 10 mm to about 75 mm. The frictional surface 502 may be provided in a variety of embodiments, for example, as illustrated in FIGS. 9-22.

Referring again to FIG. 9, in another embodiment of the invention one or more of the outer surfaces 522, 524 of the insert 44 or surfaces 526, 528 of the body 506 of the part 500 may include a relatively rough surface including a plurality of peaks 510 and valleys 512 to enhance the frictional damping of the part. In one embodiment, the surface of the insert 44 or the body 506 may be abraded by sandblasting, glass bead blasting, water jet blasting, chemical etching, machining or the like.

Each frictional surface 502 may have a plurality of peaks 510 and a plurality of valleys 512. The depth as indicated by line V of the valleys 512 may vary with embodiments. In various embodiments, the average of the depth V of the valleys 512 may range from about 1 μm-300 μm, 50 μm-260 μm, 100 μm-160 μm or variations of these ranges. However, for all cases there is local contact between the opposing frictional surfaces 502 during component operation for frictional damping to occur.

Figure 11:
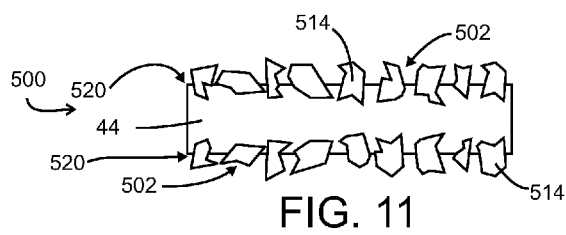
FIG. 11 is an enlarged view of one embodiment of the invention.
Figure 12:
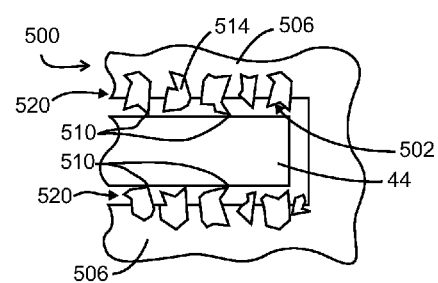
FIG. 12 is a sectional view with portions broken away of one embodiment of the invention.
Figure 13:
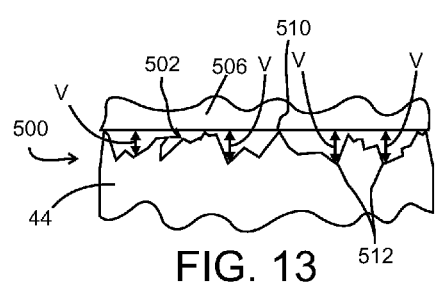
FIG. 13 is an enlarged sectional view with portions broken away of one embodiment of the invention.
Figure 14:
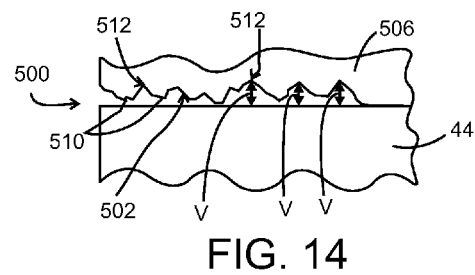
FIG. 14 is an enlarged sectional view with portions broken away of one embodiment of the invention.
Figure 15:
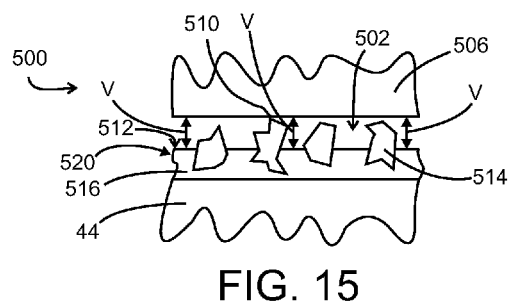
FIG. 15 is an enlarged sectional view with portions broken away of one embodiment of the invention.
Figure 16:
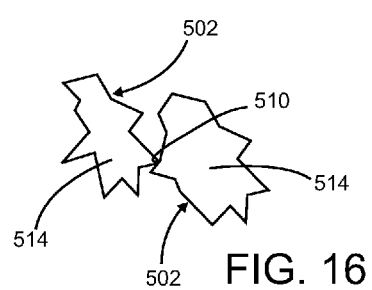
FIG. 16 illustrates one embodiment of the invention.

In another embodiment of the invention the damping means or frictional surface 502 may be provided by particles 514 or fibers provided on at least one face of the insert 44 or a surface of the body 506 of the part 500. The particles 514 may have an irregular shape (e.g., not smooth) to enhance frictional damping, as illustrated in FIG. 16. One embodiment of the invention may include a layer 520 including the particles 514 or fibers which may be bonded to each other or to a surface of the body 506 of the part or a surface of the insert 44 due to the inherent bonding properties of the particles 514 or fibers. For example, the bonding properties of the particles 514 or fibers may be such that the particles 514 or fibers may bind to each other or to the surfaces of the body 506 or the insert 44 under compression. In another embodiment of the invention, the particles 514 or the fibers may be treated to provide a coating thereon or to provide functional groups attached thereto to bind the particles together or attach the particles to at least one of a surface of the body 506 or a surface of the insert 44. In another embodiment of the invention, the particles 514 or fibers may be embedded in at least one of the body 506 of the part or the insert 44 to provide the frictional surface 502 (FIGS. 11-12).

In embodiments wherein at least a potion of the part 500 is manufactured such that the insert 44 and/or the particles 514 or fibers are exposed to the temperature of a molten material such as in casting, the insert 44 and/or particles 514 or fibers may be made from materials capable of resisting flow or resisting significant erosion during the manufacturing. For example, the insert 44 and/or the particles 514 or fibers may include refractory materials capable of resisting flow or that do not significantly erode at temperatures above 1100° F., above 2400° F., or above 2700° F. When molten material, such as metal, is cast around the insert 44 and/or the particles 514, the insert 44 or the particles 514 should not be wet by the molten material so that the molten material does not bond to the insert 44 or layer 520 at locations wherein a frictional surface 502 for providing frictional damping is desired.

Illustrative examples of suitable particles 514 or fibers include, but are not limited to, particles or fibers including silica, alumina, graphite with clay, silicon carbide, silicon nitride, cordierite (magnesium-iron-aluminum silicate), mullite (aluminum silicate), zirconia (zirconium oxide), phyllosilicates, or other high-temperature-resistant particles. In one embodiment of the invention the particles 514 may have a length along the longest dimension thereof ranging from about 1 μm-350 μm, or 10 μm-250 μm.

In another embodiment of the invention, the layer 520 may be a coating over the body 506 of the part or the insert 44. The coating may include a plurality of particles 514 which may be bonded to each other and/or to the surface of the body 506 of the part or the insert 44 by an inorganic or organic binder 516 (FIGS. 10, 15) or other bonding materials. Illustrative examples of suitable binders include, but are not limited to, epoxy resins, phosphoric acid binding agents, calcium aluminates, sodium silicates, wood flour, or clays. In another embodiment of the invention the particles 514 may be held together and/or adhered to the body 506 or the insert 44 by an inorganic binder. In one embodiment, the coating may be deposited on the insert 44 or body 506 as a liquid dispersed mixture of alumina-silicate-based, organically bonded refractory mix.

In another embodiment, the coating may include at least one of alumina or silica particles, mixed with a lignosulfonate binder, cristobalite ($SiO_2$), quartz, or calcium lignosulfonate. The calcium lignosulfonate may serve as a binder. In one embodiment, the coating may include IronKote. In one embodiment, a liquid coating may be deposited on a portion of the insert and may include any high temperature ceramic coating, such as but not limited to, Ladle Kote 310B. In another embodiment, the coating may include at least one of clay, $Al_2O_3$, $SiO_2$, a graphite and clay mixture, silicon carbide, silicon nitride, cordierite (magnesium-iron-aluminum silicate), mullite (aluminum silicate), zirconia (zirconium oxide), or phyllosilicates. In one embodiment, the coating may comprise a fiber such as ceramic or mineral fibers.

When the layer 520 including particles 514 or fibers is provided over the insert 44 or the body 506 of the part the thickness L (FIG. 10) of the layer 520, particles 514 and/or fibers may vary. In various embodiments, the thickness L of the layer 520, particles 514 and/or fibers may range from about 1 μm-400 μm, 10 μm-400 μm, 30 μm-300 μm, 30 μm-40 μm, 40 μm-100 μm, 100 μm-120 μm, 120 μm-200 μm, 200 μm-300 μm, 200 μm-250 μm, or variations of these ranges.

In yet another embodiment of the invention the particles 514 or fibers may be temporarily held together and/or to the surface of the insert 44 by a fully or partially sacrificial coating. The sacrificial coating may be consumed by molten metal or burnt off when metal is cast around or over the insert 44. The particles 514 or fibers are left behind trapped between the body 506 of the cast part and the insert 44 to provide a layer 520 consisting of the particles 514 or fibers or consisting essentially of the particles 514 or fibers.

Figure 10:
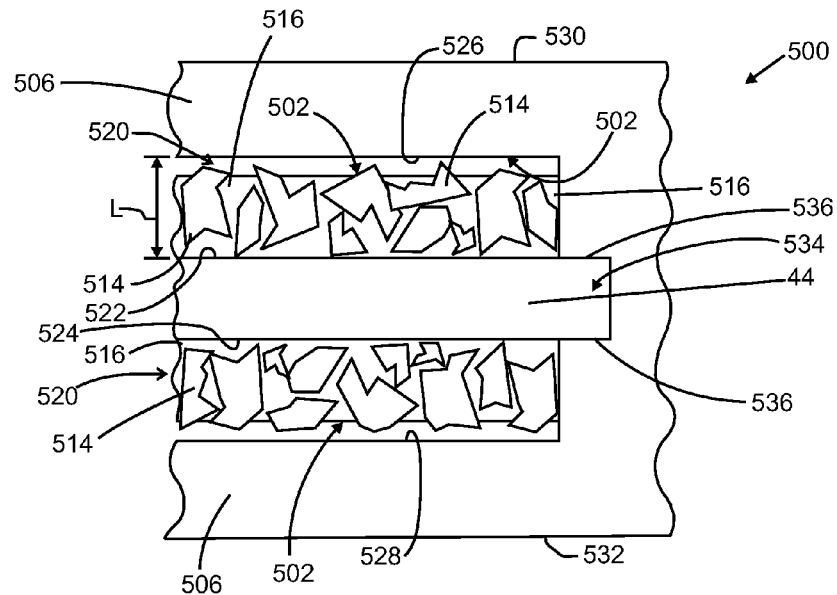
FIG. 10 is a sectional view with portions broken away of one embodiment of the invention including an insert having a layer thereon to provide a frictional surface or damping.

The layer 520 may be provided over the entire insert 44 or only over a portion thereof. In one embodiment of the invention the insert 44 may include a tab 534 (FIG. 10). For example, the insert 44 may include an annular body portion and a tab 534 extending radially inward or outward therefrom. In one embodiment of the invention at least one wettable surface 536 of the tab 534 does not include a layer 520 including particles 514 or fibers, or a wettable material such as graphite is provided over the tab 534, so that the cast metal is bonded to the wettable surface 536 to attach the insert 44 to the body 506 of the part 500 but still allow for frictional damping over the remaining insert surface which is not bonded to the casting.

In one embodiment of the invention at least a portion of the insert 44 is treated or the properties of the insert 44 are such that molten metal will not wet or bond to that portion of the insert 44 upon solidification of the molten metal. According to one embodiment of the invention at least one of the body 506 of the part or the insert 44 includes a metal, for example, but not limited to, aluminum, titanium, steel, stainless steel, cast iron, any of a variety of other alloys, or metal matrix composite including abrasive particles. In one embodiment of the invention the insert 44 may include a material such as a metal having a higher melting point than the melting point of the molten material being cast around a portion thereof.

In one embodiment the insert 44 may have a minimum average thickness of 0.2 mm and/or a minimum width of 0.1 mm and/or a minimum length of 0.1 mm. In another embodiment the insert 44 may have a minimum average thickness of 0.2 mm and/or a minimum width of 2 mm and/or a minimum length of 5 mm. In other embodiments the insert 44 may have a thickness ranging from about 0.1-20 mm, 0.1-6.0 mm, or 1.0-2.5 mm, or ranges therebetween.

Referring now to FIGS. 13-14, again the frictional surface 502 may have a plurality of peaks 510 and a plurality of valleys 512. The depth as indicated by line V of the valleys 512 may vary with embodiments. In various embodiments, the average of the depth V of the valleys 512 may range from about 1 µm-300 µm, 50 µm-260 µm, 100 µm-160 µm or variations of these ranges. However, for all cases there is local contact between the body 506 and the insert 44 during component operation for frictional damping to occur.

In other embodiments of the invention improvements in the frictional damping may be achieved by adjusting the thickness (L, as shown in FIG. 10) of the layer 520, or by adjusting the relative position of opposed frictional surfaces 502 or the average depth of the valleys 512.

In one embodiment the insert 44 is not pre-loaded or under pre-tension or held in place by tension. In one embodiment the insert 44 is not a spring. Another embodiment of the invention includes a process of casting a material comprising a metal around an insert 44 with the proviso that the frictional surface 502 portion of the insert used to provide frictional damping is not captured and enclosed by a sand core that is placed in the casting mold. In various embodiments the insert 44 or the layer 520 includes at least one frictional surface 502 or two opposite friction surfaces 502 that are completely enclosed by the body 506 of the part. In another embodiment the layer 520 including the particles 514 or fibers that may be completely enclosed by the body 506 of the part or completely enclosed by the body 506 and the insert 44, and wherein at least one of the body 506 or the insert 44 comprises a metal or consists essentially of a metal. In one embodiment of the invention the layer 520 and/or insert 44 does not include or is not carbon paper or cloth.

Referring again to FIGS. 9-10, in various embodiments of the invention the insert 44 may include a first face 522 and an opposite second face 524 and the body 506 of the part may include a first inner face 526 adjacent the first face 522 of the insert 44 constructed to be complementary thereto, for example nominally parallel thereto. The body 506 of the part includes a second inner face 528 adjacent to the second face 524 of the insert 44 constructed to be complementary thereto, for example parallel thereto. The body 506 may include a first outer face 530 overlying the first face 522 of the insert 44 constructed to be complementary thereto, for example parallel thereto. The body 506 may include a first outer face 532 overlying the second face 524 of the insert 44 constructed to be complementary thereto, for example parallel thereto. However, in other embodiments of the invention the outer faces 530, 532 of the body 506 are not complementary to associated faces 522, 524 of the insert 44. When the damping means is provided by a narrow slot-like feature 508 formed in the body 506 of the part 500, the slot-like feature 508 may be defined in part by a first inner face 526 and a second inner face 528 which may be constructed to be complementary to each other, for example parallel to each other. In other embodiments the surfaces 526 and 528; 526 and 522; or 528 and 524 are mating surfaces but not parallel to each other.

Figure 17:
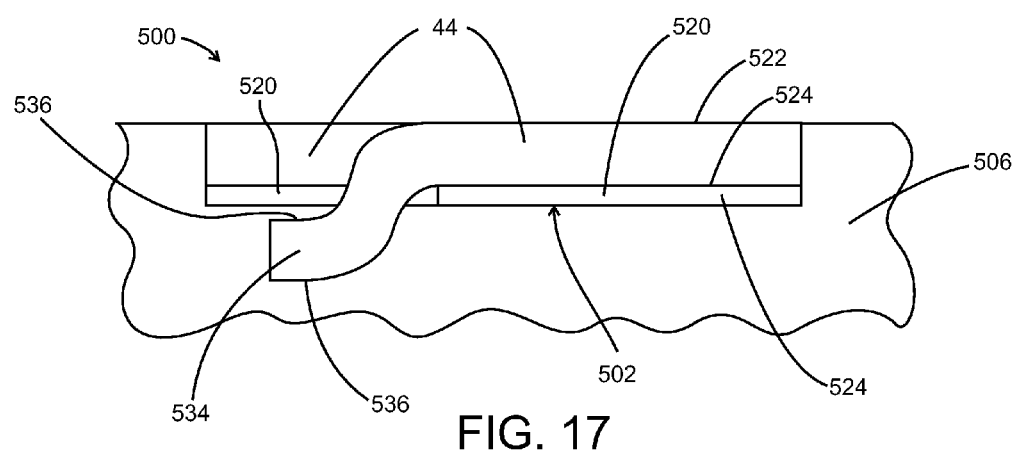
FIG. 17 is a sectional view with portions broken away of one embodiment of the invention.
Figure 18:
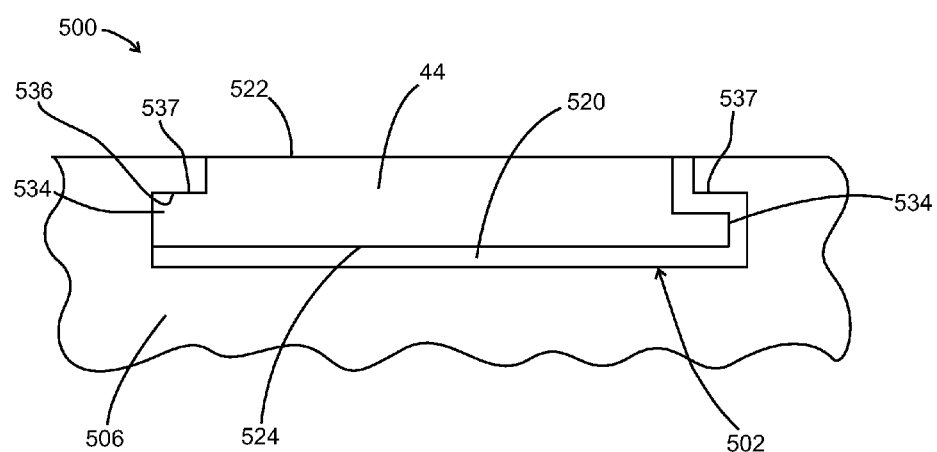
FIG. 18 is a sectional view with portions broken away of one embodiment of the invention.

Referring to FIGS. 17-18, in one embodiment of the invention the insert 44 may be an inlay wherein a first face 522 thereof is not enclosed by the body 506 of the part. The insert 44 may include a tang or tab 534 which may be bent downward as shown in FIG. 17. In one embodiment of the invention a wettable surface 536 may be provided that does not include a layer 520 including particles 514 or fibers, or a wettable material such as graphite is provided over the tab 534, so that the cast metal is bonded to the wettable surface 536 to attach the insert 44 to the body of the part but still allow for frictional damping on the non-bonded surfaces. A layer 520 including particles 514 or fibers may underlie the portion of the second face 524 of the insert 44 not used to make the bent tab 534.

In another embodiment the insert 44 includes a tab 534 which may be formed by machining a portion of the first face 522 of the insert 44 (FIG. 18). The tab 534 may include a wettable surface 536 having cast metal bonded thereto to attach the insert 44 to the body of the part but still allow for friction damping by way of the non-bonded surfaces. A layer 520 including particles 514 or fibers may underlie the entire second face 524 or a portion thereof. In other embodiments of the invention all surfaces including the tabs 534 may be non-wettable, for example by way of a coating 520 thereon, and features of the body portion 506 such as, but not limited to, a shoulder 537 may be used to hold the insert 44 in place.

Figure 19:
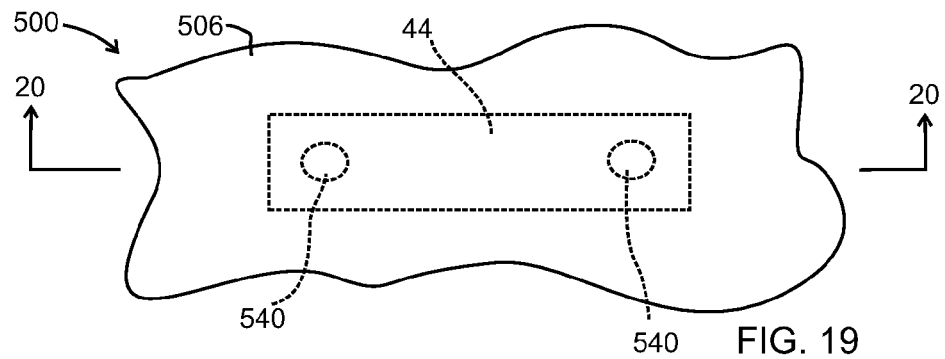
FIG. 19 is a plan view with portions broken away illustrating one embodiment of the invention.

Referring now to FIG. 19, one embodiment of the invention may include a part 500 having a body portion 506 and an insert 44 enclosed by the body part 506. The insert 44 may include through holes formed therein so that a stake or post 540 extends into or through the insert 44.

Figure 20:
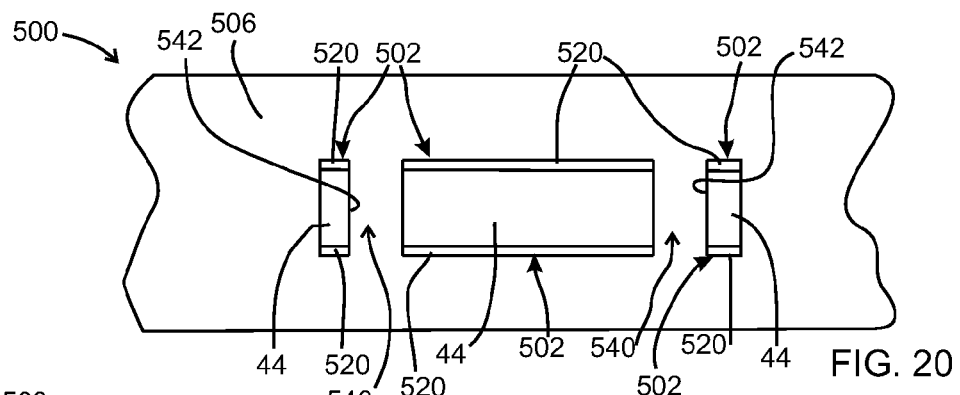
FIG. 20 is a sectional view taken along line 20-20 of FIG. 19 illustrating one embodiment of the invention.

Referring to FIG. 20, which is a sectional view of FIG. 19 taken along line 20-20, in one embodiment of the invention a layer 520 including a plurality of particles 514 or fibers (not shown) may be provided over at least a portion of the insert 44 to provide a frictional surface 502 and to prevent bonding thereto by cast metal. The insert 44 including the layer 520 may be placed in a casting mold and molten metal may be poured into the casting mold and solidified to form the post 540 extending through the insert 44. An inner surface 542 defining the through hole of the insert 44 may be free of the layer 520 or may include a wettable material thereon so that the post 540 is bonded to the insert 44. Alternatively, in another embodiment the post 44 may not be bonded the insert 44 at the inner surface 542. The insert 44 may include a feature such as, but not limited to, a shoulder 505 and/or the post 540 may include a feature such as, but not limited to, a shoulder 537 to hold the insert in place.

Figure 21:
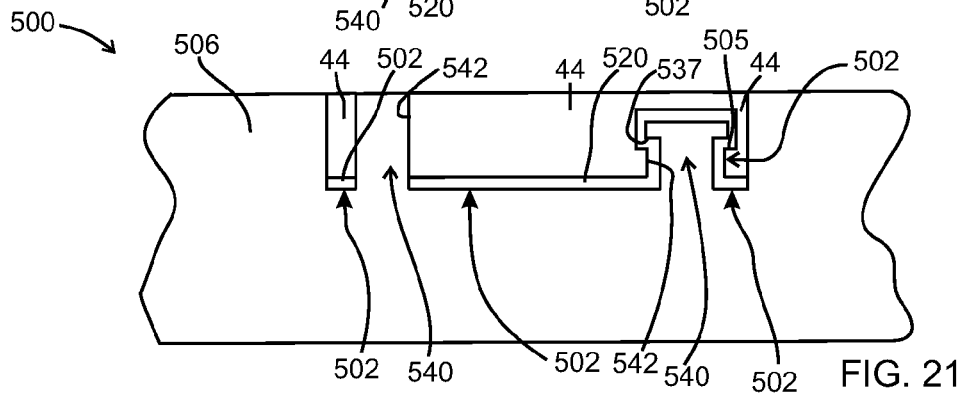
FIG. 21 is a sectional view with portions broken away illustrating one embodiment of the invention.

Referring now to FIG. 21, in another embodiment, the insert may be provided as an inlay in a casting including a body portion 506 and may include a post 540 extending into or through the insert 44. The insert 44 may be bonded to the post 540 to hold the insert in place and still allow for frictional damping. In one embodiment of the invention the insert 44 may include a recess defined by an inner surface 542 of the insert 44 and a post 540 may extend into the insert 44 but not extend through the insert 44. In one embodiment the post 44 may not be bonded to the insert 44 at the inner surface 542. The insert 44 may include a feature such as, but not limited to, a shoulder 505 and/or the post 540 may include a feature such as, but not limited to, a shoulder 537 to hold the insert in place.

Figure 22:
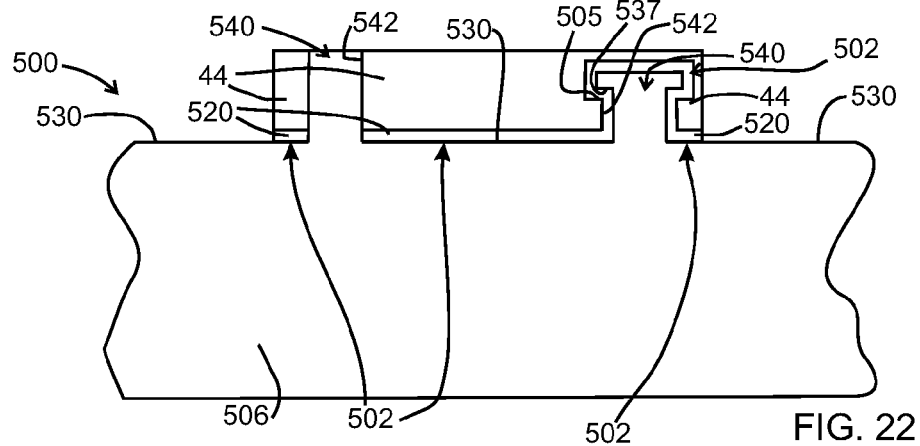
FIG. 22 is a sectional view, with portions broken away illustrating another embodiment of the invention.

Referring now to FIG. 22, in another embodiment of the invention, an insert 44 or substrate may be provided over an outer surface 530 of the body portion 506. A layer 520 may or may not be provided between the insert 44 and the outer surface 530. The insert 44 may be constructed and arranged with through holes formed therethrough or a recess therein so that cast metal may extend into or through the insert 44 to form a post 540 to hold the insert in position and still allow for frictional damping. The post 540 may or may not be bonded to the insert 44 as desired. The post 540 may extend through the insert 44 and join another portion of the body 506 if desired.

When the term "over," "overlying," "overlies," "under," "underlying," or "underlies" is used herein to describe the relative position of a first layer or component with respect to a second layer or component such shall mean the first layer or component is directly on and in direct contact with the second layer or component or that additional layers or components may be interposed between the first layer or component and the second layer or component.

The above description of embodiments of the invention is merely exemplary in nature and, thus, variations thereof are not to be regarded as a departure from the spirit and scope of the invention.

What is claimed is:

1. A product comprising:
an annular portion comprising a first annular flange portion and a second annular flange portion, the annual portion having a slot formed therein between the first annular flange portion and the second annular flange portion;
a hub portion comprising a huh flange, wherein the hub flange comprises a first hub flange portion, a second hub flange portion, and an insert;
wherein the first annular flange portion extends into the hub flange and engages the first hub flange portion and the insert;
wherein the second annular flange portion extends into the hub flange and engages the second hub flange portion and the insert; and wherein the insert is constructed and arranged to friction damp vibration of the product.

2. A product as set forth in claim 1 wherein the annular portion comprises a first material, and the hub portion comprises a second material that is lighter by volume than the first material.

3. A product as set forth in claim 2 wherein the second material is lighter in volume than the first material.

4. A product as set forth in claim 2 wherein the first material and the second material are substantially the same.

5. A product as set forth in claim 1 wherein at least one of the first annular flange portion or the second annular flange portion comprises a plurality of through holes.

6. A product as set forth in claim 1 wherein at least one of the first annular flange portion or the second annular flange portion comprises a plurality of teeth and the hub flange is configured to engage the plurality of teeth.

7. A product as set forth in claim 6 wherein at least one of the first annular flange portion or the second annular flange portion comprises a plurality of through holes.

8. A product as set forth in claim 7 wherein the hub flange further engages at least one of the first annular flange portion or the second annular flange portion in the through holes of at least one of the first annular flange portion or the second annular flange portion.

9. A product as set forth in claim 2 wherein the first material comprises one of cast iron, gray cast iron, or steel.

10. A product as set forth in claim 2 wherein the second material comprises one of aluminum, aluminum metal matrix composites, titanium, magnesium, plastic, or composite material.

11. A product as set forth in claim 1 wherein the annular portion comprises one of a bracket, pulley, or brake drum.

12. A product as set forth in claim 1 wherein the insert has a thickness of about 1 mm to about 3 mm.

13. A product as set forth in claim 1 further comprising a coating over the surface of the annular portion defining the slot.

14. A product as set forth in claim 13 wherein the coating has a thickness of about 10 μm to about 400 μm.

15. A product as set forth in claim 13 wherein the coating comprises particles or fibers over at least a portion of the surface defining the slot.

16. A product as set forth in claim 1 further comprising a coating over at least a portion of the insert.

17. A product as set forth in claim 16 wherein the coating has a thickness of about 10 μm to about 400 μm.

18. A product as set forth in claim 16 wherein the coating comprises particles or fibers over a portion of the surface defining the slot.

19. A product comprising:
an annular portion comprising a first annular flange portion and a second annular flange portion, the annual portion having a slot formed therein between the first annular flange portion and the second annular flange portion;
a hub portion comprising a hub flange, wherein the hub flange comprises a first huh flange portion, a second huh flange portion, and an insert;
wherein the first annular flange portion extends into the hub flange and engages the first hub flange portion and the insert;
wherein the second annular flange portion extends into the hub flange and engages the second hub flange portion and the insert; and wherein the insert is constructed and arranged to friction damp the product, wherein at least one of the first annular flange portion or the second annular flange portion comprises a plurality of through holes, and wherein the hub flange further engages at least one of the first annular flange portion or the second annular flange portion in the through holes of at least one of the first annular flange portion or the second annular flange portion.

20. A product as set forth in claim 1 wherein the product is a brake rotor.

21. A product comprising:
an annular portion comprising a first annular flange portion and a second annular flange portion, the annual portion having a slot formed therein between the first annular flange portion and the second annular flange portion;
a hub portion comprising a hub flange, wherein the hub flange comprises a first hub flange portion, a second hub flange portion, and an insert;
wherein the first annular flange portion extends into the hub flange and engages the first hub flange portion and the insert;
wherein the second annular flange portion extends into the hub flange and engages the second hub flange portion and the insert; and wherein the insert is constructed and arranged to friction damp vibration of the annular portion thereby reducing noise caused by vibration of the annular portion.

* * * * *